Sept. 15, 1953
H. D. DAVIS
2,652,273
LINE SPLICER
Filed Nov. 15, 1951
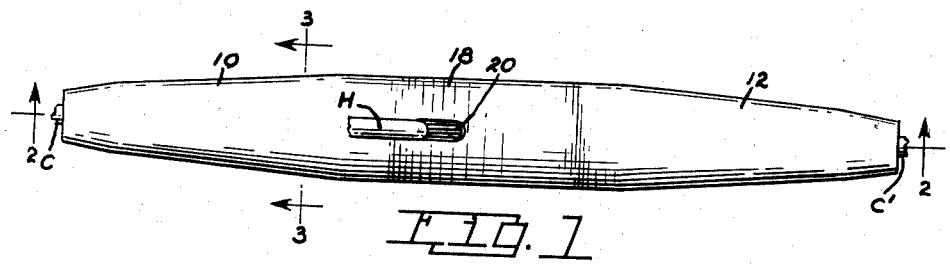
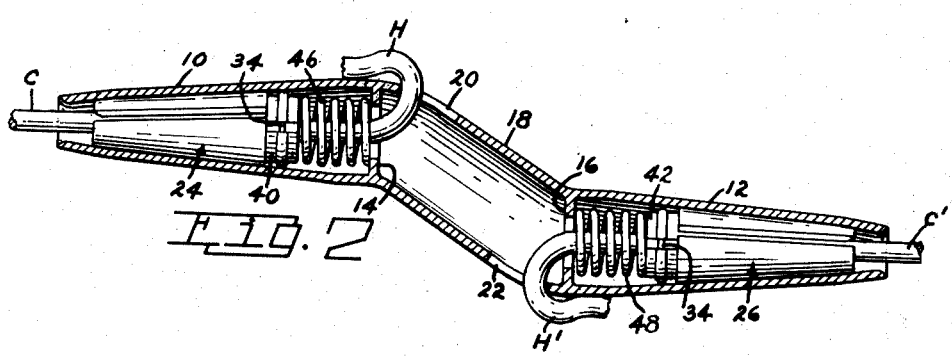
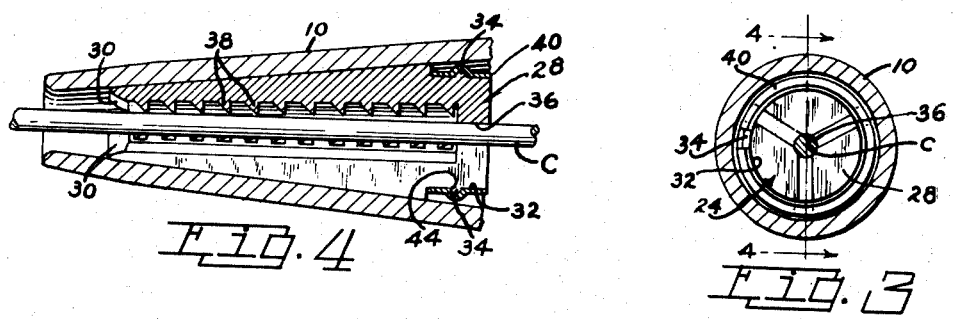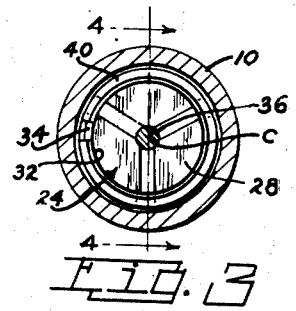
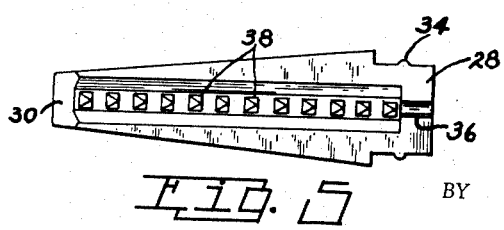
INVENTOR
*HAROLD D. DAVIS*
BY
*J.B.Dickman Jr*
ATTORNEY Patented Sept. 15, 1953

2,652,273

UNITED STATES PATENT OFFICE 2,652,273

LINE SPLICER

Harold D. Davis, Montebello, Calif.

Application November 15, 1951, Serial No. 256,435

1 Claim. (Cl. 287—113)

The present invention relates to a line splice and more particularly to a line splice of the type disclosed in United States Patents 2,144,050 and 492,811.

The primary object of the present invention is to off-set the connected ends of a line or cable and to clearly eliminate direct axial pull on the line or cable connecting member.

Another object of the present invention is to facilitate the securing of the lines in the connecting member and to enable the lines to be firmly anchored therein.

A still further object of the present invention is the provision of a line splice that will prevent the connected ends of a line from separating from the line splicer.

The above and other objects of the present invention may be attained by employing this invention which embodies among its features a pair of laterally spaced elongated hollow frusto-conical socket members, a tubular member joining and extending diagonally between the larger ends of the socket members, and means within the socket members and engaging the walls thereof for gripping cables introduced into the socket members through the smaller ends thereof.

Other features include spring means within the socket members for engaging the cable gripping means and advancing them toward the smaller ends of the socket members to cause them to grip the cables and openings extending through the tubular member through which the cables may be projected and bent to anchor the cables in the socket members.

In the drawings,

Figure 1 is a side view of a line splice embodying the features of this invention.

Figure 2 is a longitudinal sectional view taken substantially on the line 2—2 of Figure 1.

Figure 3 is an enlarged transverse sectional view taken substantially on the line 3—3 of Figure 1.

Figure 4 is a fragmentary longitudinal sectional view taken substantially on the line 4—4 of Figure 3, and Figure 5 is a plan view of one of the jaw members.

Referring to the drawing in detail the line splice herein referred to comprises a pair of elongated hollow frusto-conical socket members 10 and 12 carrying adjacent their larger ends inwardly extending annular flanges 14 and 16 respectively forming stops, the purpose of which will hereinafter appear.

As illustrated in Figure 2, the socket members lie along spaced parallel axes and carried by and extending between the larger ends of the socket members 10 and 12 is a diagonal tubular member 18. Extending through opposite sides of the tubular member 18 adjacent the flanges 14 and 16 respectively are elongated longitudinally extending slots 20 and 22, the purpose of which will hereinafter appear.

Mounted within the sockets 10 and 12 respectively between the flanges 14 and 16 and the smaller ends of the respective sockets for longitudinal movement in their respective sockets are groups 24 and 26 of cable gripping jaws each comprising three elongated jaws of substantially triangular cross-section which taper longitudinally throughout substantially their entire length so that as they advance toward the smaller ends of their respective sockets they will be moved radially toward one another. Each jaw member of each group is provided at its larger end with an arcuate extension 28 and at its smaller end with an inclined guide face 30. The convex side 32 of each arcuate extension 28 is provided intermediate its ends with an outwardly extending rib 34 while the concave side 36 of each extension 28 serves to accommodate a cable C when the latter is extended axially between a group of jaws. Carried by the jaws of each group between the inclined guide face 30 and the arcuate extension 28 thereof with a longitudinal row of cable gripping teeth 38 and surrounding the extensions 28 of the groups 24 and 26 of jaws are split rings 40 and 42. These rings 40 and 42 are provided intermediate their ends with annular indentations 44 for the reception of the ribs 34 above referred to.

Compression coiled springs 46 and 48 are contained within the respective socket members 10 and 12 and bear respectively on the flanges 14 and the group 24 of jaws and on the flange 16 and the group of jaws 26 to yieldingly urge the respective groups of jaws toward the smaller ends of their respective socket members.

In use a cable C entered into the socket member 10 will be guided by the guide faces 30 and will move the group 24 of jaws against the effort of the spring 46 toward the larger end of the socket member 10 until the jaws in the group 24 expand and permit the cable C to pass between them and longitudinally through the socket 10. When the cable C has thus been moved through the socket member 10, the teeth 38 will close about the cable C by their movement under the influence of the spring 46 and the engagement of the jaws with the inner inclined wall of the socket 10 to lock said cable C against extraction from the socket 10. The cable C is thrust through the socket for a distance such that it may be bent outwardly and projected through the slot 20 in the tubular member 18 and bent to form a hook H which will cooperate with the group 24 of jaws in holding the cable C in place. The cable C' is thrust through the socket member 12 and is held therein by the group 26 of jaw members, and extended through the slot 22 and bent over to form the hook H'.

From the foregoing description, when taken in connection with the accompanying drawings, the advantages of the construction and operation will be apparent to those skilled in the art to which the invention appertains, and I desire to have it understood that the device shown is merely illustrative and that such changes may be made within the scope of the claim hereto appended.

What is claimed is:

In a line splice, a unitary structure comprising a pair of laterally spaced elongated hollow frusto-conical socket portions having bores therein, a tubular portion connecting the inner parts of said socket portions, said tubular portion extending diagonally between said socket members, and having slots in respective alignment with each of said bores, whereby the ends of a line to be spliced will pass thru the respective bores and slots and by bending will be positively locked.

HAROLD D. DAVIS.

References Cited in the file of this patent

UNITED STATES PATENTS

| Number | Name | Date |
|---|---|---|
| 2,040,678 | Van Buskirk | May 12, 1936 |
| 2,041,108 | Becker | May 19, 1936 |
| 2,144,050 | Fotsch | Jan. 17, 1939 |
| 2,222,494 | Barlow | Nov. 19, 1940 |
| 2,463,145 | Buchanan | Mar. 1, 1949 |
| 2,554,387 | Saul | May 22, 1951 |

FOREIGN PATENTS

| Number | Country | Date |
|---|---|---|
| 334,191 | Germany | Mar. 11, 1921 |
| 439,189 | France | June 7, 1912 |
| 856,533 | France | June 17, 1940 |